United States Patent
Osada et al.

(10) Patent No.: US 10,312,500 B2
(45) Date of Patent: Jun. 4, 2019

(54) FORMATION OF SLURRY FOR HIGH LOADING SULFUR CATHODES

(71) Applicant: Toyota Motor Engineering & Manufacturing North America, Inc., Erlanger, KY (US)

(72) Inventors: Naoki Osada, Northville, MI (US); Claudiu B. Bucur, Ypsilanti, MI (US); John Muldoon, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 559 days.

(21) Appl. No.: 14/988,917

(22) Filed: Jan. 6, 2016

(65) Prior Publication Data

US 2017/0194636 A1    Jul. 6, 2017

(51) Int. Cl.
| | |
|---|---|
| *H01M 4/00* | (2006.01) |
| *H01M 4/04* | (2006.01) |
| *H01M 4/66* | (2006.01) |
| *H01M 4/36* | (2006.01) |
| *H01M 4/62* | (2006.01) |
| *H01M 4/139* | (2010.01) |
| *H01M 4/58* | (2010.01) |
| *H01M 10/052* | (2010.01) |
| *H01M 10/0568* | (2010.01) |
| *H01M 10/0569* | (2010.01) |

(52) U.S. Cl.
CPC ....... *H01M 4/0435* (2013.01); *H01M 4/0404* (2013.01); *H01M 4/139* (2013.01); *H01M 4/366* (2013.01); *H01M 4/581* (2013.01); *H01M 4/622* (2013.01); *H01M 4/625* (2013.01); *H01M 4/661* (2013.01); *H01M 10/052* (2013.01); *H01M 10/0568* (2013.01); *H01M 10/0569* (2013.01)

(58) Field of Classification Search
CPC .......... H01M 4/0435; H01M 10/0569; H01M 10/052; H01M 4/581; H01M 4/139; H01M 10/0568; H01M 4/0404; H01M 4/622; H01M 4/625; H01M 4/366; H01M 4/661
See application file for complete search history.

(56) References Cited

U.S. PATENT DOCUMENTS

| | | | | |
|---|---|---|---|---|
| 6,110,619 | A * | 8/2000 | Zhang | H01B 1/12 252/519.34 |
| 2005/0064295 | A1* | 3/2005 | Iwanaga | H01M 10/0525 429/330 |
| 2012/0171566 | A1* | 7/2012 | Yoshitake | B82Y 30/00 429/209 |
| 2013/0065128 | A1* | 3/2013 | Li | H01M 10/0525 429/218.1 |

* cited by examiner

*Primary Examiner* — Nicholas P D'Aniello
(74) *Attorney, Agent, or Firm* — Oblon, McClelland, Maier & Neustadt, L.L.P.

(57) ABSTRACT

A high density slurry comprising encapsulated sulfur particles, carbon nanofibers and activated carbon black suitable for use in forming the active material of an electrode. A method for forming the high density sulfur slurry is also provided. A cathode containing the particles and a battery constructed with the cathode as well as methods for their formation are also provided.

25 Claims, 4 Drawing Sheets

FORMATION OF SLURRY FOR HIGH LOADING SULFUR CATHODES

BACKGROUND

Field of the Disclosure

This disclosure is directed to high density slurries comprising encapsulated sulfur and/or chalogen particles, carbon nanofibers and activated carbon black. The slurry is suitable for use in forming the active material of an electrode. This disclosure is also directed to a cathode formed from the dried slurry as well as an electrochemical cell or battery containing the cathode.

Discussion of the Background

Future electric vehicles and portable electronics will demand the advent of super-batteries with higher energy densities than what is currently offered by lithium ion. The goal of battery research is to couple a metal anode such as lithium or magnesium with a high capacity conversion cathode such as sulfur or oxygen without sacrificing cycle life and rate capability. While sulfur is economical, highly abundant and has a charge capacity an order of magnitude higher than insertion lithium ion cathodes, it is electrically insulating and it suffers from mass loss during cycling due to reduction intermediates that are highly soluble.

While sulfur has been an attractive cathode for more than fifty years, its viability has been hindered by two fundamental challenges which need to be resolved. The first challenge is to enhance the conductivity of elemental sulfur. Unlike commercial lithium ion cathodes (i.e. $LiCoO_2$) which possess a high electronic conductivity and do not require significant addition of conductive additives, sulfur is a good insulator. Sulfur is approximately 1 billion times less conductive than $LiCoO_2$. The second challenge is to control the diffusion of polysulfide intermediates formed during cycling. During discharge, sulfur reduces in a stepwise manner by forming a series of polysulfide intermediates which are ionic in nature and solvate easily in the electrolyte. This causes mass loss of active material upon cycling. Even today, while approaches mitigate these fundamental challenges of low conductivity and dissolution of polysulfides, they also diminish the superior charge capacity of sulfur. One problem deriving from the insulating nature of sulfur is the need for high loadings of conductive additives to improve the overall electronic conductivity. This results in low sulfur content in the cathode. A second problem is the slow rate of operation due to the low electronic conductivity of sulfur and the low ionic conductivity of the reduced product, $Li_2S$. A third problem is the diffusion of ionic polysulfides which limits cycle life due to anode passivation and mass loss from the cathode.

Extensive research efforts have been devoted to developing methods to enhance the conductivity of elemental sulfur and to control the diffusion of polysulfide intermediates formed during cycling. Researchers have studied using sulfur infusion into conductive hosts or polymer coatings of sulfur composites to address these problems. Since the benefit of infusing sulfur into ordered mesoporous carbon was demonstrated, various micro/nano carbon hosts including spheres, nanofibers, graphene oxide and carbon paper have been investigated as conductive hosts to contain the sulfur active material (Nazar et al. Nature Materials, 20089, 8, 500-506). A microporous carbon interlayer with pore sizes matching the dimensions of the polysulfide ions has recently been demonstrated (Manthiram et al. Nature Communications, 2012, 3, 1166). In addition, infused sulfur into metal organic frameworks (MOF) with the goal of benefiting from interactions between the polysulfides and the MOF oxide surface has been shown (Tarascon et al. Journal of the American Chemical Society, 2011, 133, 16154-16160). While these approaches improve the conductivity of the sulfur cathode, they are still plagued by diffusion of polysulfides out of the host pores which limits cycle life. Furthermore, the overall sulfur loading in the electrode is low (~<50% sulfur ratio with an areal loading of sulfur around 1 mg $S/cm^2$) which is too low to compete with the energy density of commercial lithium ion batteries.

In view of the forgoing, there is a need to provide batteries having significantly increased energy density and thus the generation of high capacity cathode materials is necessary. Thus, one object of the present disclosure is to provide a high density slurry comprising elemental sulfur and conductive materials which is suitable for use in the formation of the active material of an electrode. A second object of the present disclosure is to provide a method for forming the high density slurry. A third object of the present disclosure is to provide an electrode comprising the dried high density slurry as an active material which is suitable for use in a battery having a significantly increased capacity and high cycle lifetime. A fourth object of the present disclosure is to provide a battery comprising the electrode having a sufficiently high capacity and a sufficiently high cycle lifetime to be a power source for an electric vehicle.

SUMMARY OF THE DISCLOSURE

These and other objects have been achieved by the present disclosure. According to a first aspect, the present disclosure relates to a slurry, comprising (i) encapsulated chalcogen particles, (ii) carbon nanofibers, (iii) carbon black, (iv) carboxymethyl cellulose, (v) styrene butadiene rubber, and (vi) water, wherein a content of sulfur is greater than 85 wt % relative to the total dry weight of the slurry, and the ratio of carbon nanofibers to carbon black is 3:1.

In one embodiment, a total content of the carbon nanofiber and carbon black is less than 10 wt % relative to the total dry weight of the slurry.

In one embodiment, a total content of the carboxymethyl cellulose and styrene butadiene rubber is less than 5 wt % relative to the total dry weight of the slurry.

In one embodiment, a ratio of carboxymethyl cellulose to styrene butadiene rubber is 3:1.

In one embodiment, water is present in an amount equal to 0.25-1.25 times the total dry weight of the slurry.

In one embodiment, a sulfur content of the encapsulated chalcogen particles is greater than 90 wt % relative to a total weight of the encapsulated chalcogen particles.

In one embodiment, the encapsulated chalcoge particles comprise (i) a chalcogen core and (ii) a polymer coating disposed on a surface of the chalcogen core, wherein the chalcogen core comprises at least one element selected from the group consisting of sulfur, selenium and tellurium.

In one embodiment, the polymer coating comprises at least one polymer selected from the group consisting of poly (3,4-ethylenedioxythiophene) polystyrene sulfonate, polyvinylpyrrolidone, polyamiline, poly(ethylene oxide), carboxymethyl cellulose, sodium carboxymethyl cellulose, polymethacrylic acid, [poly(2-acrylamido-2-methyl-1-propane sulfonic acid)], branched polyethylenimine, and poly (diallyl dimethylammonium chloride).

In one embodiment, a selenium content or a tellurium content of the encapsulated chalcogen particles is less than 50 wt % relative to a total weight of the encapsulated chalcogen particles.

In one embodiment, the encapsulated chalcogen particles further comprise carbon black particles, functionalized carbon black particles or both homogeneously dispersed in the chalcogen core.

According to a second aspect, the present disclosure relates to a method for forming the slurry, comprising (i) forming a powder mixture comprising 90 wt % of the encapsulated chalcogen particles relative to the total dry weight of the slurry and 8 wt % of carbon nanofibers and carbon black together relative to the total dry weight of the slurry, (ii) grinding the powder mixture to form a fine powder of carbon and active material, (iii) adding a weight corresponding to 2 wt % of carboxymethyl cellulose and styrene butadiene rubber together relative to the total dry weight of the slurry to the fine powder of carbon and active material to form a thick slurry, (iv) adding water to the thick slurry and (v) mixing the thick slurry to form the slurry.

In one embodiment, water is added in an amount of 0.4-1.2 mL per g of the thick slurry.

In one embodiment, the mixing is performed by planetary centrifugation for up to fifteen minutes at a speed of greater than 1000 rpm.

In one embodiment, the method further comprises ball milling the fine powder of carbon and active material for up to 2 hours at a speed of less than 200 rpm.

According to a third aspect, the present disclosure relates to an electrode comprising (i) the dried slurry as active material and (ii) a current collector, wherein the dried slurry is on a surface of the current collector.

In one embodiment, the sulfur weight per current collector area is in the range of 3-8 mg/cm$^2$.

In one embodiment, the current collector comprises aluminum.

According to a fourth aspect, the present disclosure relates to a method for forming the electrode, comprising (i) pouring the slurry onto the current collector, (ii) forming a wet gap of less than 200 μm to obtain a green electrode, (iii) drying the green electrode, and (iv) calendaring the dried green electrode to form the electrode.

In one embodiment, the drying is performed in an oven at a temperature of up to 100° C. for up to 12 hours.

In one embodiment, the dried green electrode is calendered such that the electrode has 50% of the thickness of the dried green electrode.

According to a fifth aspect, the present disclosure relates to a battery, comprising (i) the electrode as a cathode, (ii) an anode, and (iii) an electrolyte in a solvent.

In one embodiment, the anode comprises an alkali metal, an alkaline earth metal, or both.

In one embodiment, the solvent comprises glyme and dioxolane in a weight ratio of 1:1.

In one embodiment, the anode is lithium and the electrolyte comprises LiTFSI and LiNO$_3$ in a molar ratio of 5:1.

In one embodiment, the anode is lithium and the anode is pretreated with at least one lithium polysulfide.

According to a sixth aspect, the present disclosure relates to a vehicle comprising the battery.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
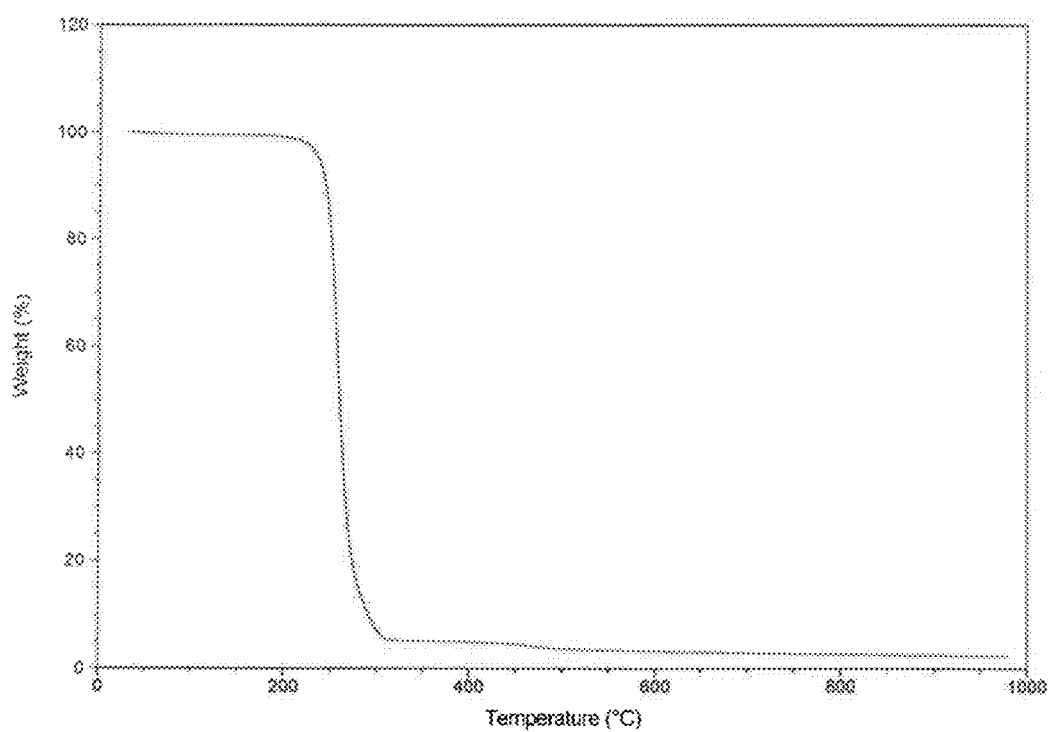
FIG. 1 shows a thermogravimetric analysis (TGA) plot of encapsulated sulfur active material with 95% sulfur content and 5% polymer coating and carbon content.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the word "a" and "an" and the like carry the meaning of "one or more". The phrases "selected from the group consisting of", "chosen from", and the like include mixtures of the specified materials, Terms such as "contain(s)' and the like are open terms meaning "including at least" unless otherwise specifically noted.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods. In order to achieve this goal and in view of the technologies described. above, the inventors have studied methods to increase the electrical conductivity of cathodic materials. In this effort, the inventors have discovered cathodic materials that increase both the sulfur ratio and areal loading to levels as high as 90% and greater than 6 mg S/cm$^2$, which are commercially attractive and furthermore increase the conductivity leading to significantly improved performance as cathode active materials.

Thus, the first embodiment of the present disclosure provides a slurry, preferably a high density or high solids slurry, more preferably a sulfur slurry, a high density sulfur slurry or a high solids sulfur slurry, comprising (i) encapsulated chalcogen particles, (ii) carbon nanofibers, (iii) carbon black, (iv) carboxymethyl cellulose, (v) styrene butadiene rubber and (vi) water, wherein the content of sulfur is greater than 85 wt % relative to the total dry weight of the slurry, preferably greater than 85.5 wt %, preferably greater than 86%, preferably greater than 87%, preferably greater than 88%, preferably greater than 89%, preferably greater than 90% relative to the total dry weight of the slurry and wherein the ratio of carbon nanofibers to carbon black is 3:1.

As used herein, a "slurry" refers to a slurry or suspension wherein an amount of water is added to partially dissolve the solid components of the mixture, such that some of the solid components are fully dissolved and some of the solid components remain in solid form. In one embodiment the percent solids in the slurry is 2-60%, preferably 5-50%, preferably 10-40%, more preferably 20-30%.

As used herein, carbon nanofibers (CNFs), vapor grown carbon fibers (VGCFS), or vapor grown carbon nanofibers (VGCNFs) are used interchangeably and refer to cylindrical nanostructures with graphene layers arranged as stacked cones (conical), cups or plates (platelet-like), Carbon nanofibers with graphene layers wrapped into perfect cylinders may be called carbon nanotubes (CNTs), multi-walled carbon nanotubes (MWCNTs) and single-walled carbon nanotubes (SWCNTs). Carbon nanofibers are discontinuous, highly graphitic, highly compatible with processing techniques and can be dispersed in an isotropic or anisotropic mode.

In one embodiment, the individual nanofiber may comprise a morphology having a hollow core that is surrounded by a cylindrical fiber comprised of high crystalline, graphite basal planes stacked at 10-40°, preferably 15-35°, preferably 20-30°, or 25° from the longitudinal axis of the fiber. This morphology, termed "stacked cup" or "herringbone" generates a fiber with exposed edge planes along the entire interior and exterior surfaces of the nanofiber. In one embodiment, the carbon nanofibers have an average length in the range of 10-150 μm, preferably 25-125 μm, more preferably 50-100 μm. In one embodiment, the carbon nanofibers have an average out diameter of 50-250 nm, preferably 75-200 nm, preferably 100-175 nm, more preferably 125-150 nm and an average inner diameter of 25-150 nm, preferably 30-125 nm, preferably 35-100 nm, preferably 40-80 nm, more preferably 50-70 nm. In one embodiment, the carbon nanofibers have an average specific surface area of 10-100 $m^2/g$, preferably 15-80 $m^2/g$, more preferably 20-75 $m^2/g$ and a total pore volume 0.05-0.15 $cm^3/g$, preferably 0.075-0.14 $cm^3/g$, preferably 0.10-0.13 $cm^3/g$.

As used herein, carbon black refers to a conductive carbon material in the form of paracrystalline carbon having a high surface area to volume ratio. Exemplary types of carbon black include, but are not limited to acetylene black, channel black, furnace black, lamp black, thermal black, as well as commercially available carbon blacks including, but not limited to Ketjen black, SuperP, Super P Li, Super C65, Enasco black and mixtures thereof. In a preferred embodiment, the carbon black comprises acetylene black, Ketjen black or SuperP Li, more preferably Ketjen black or SuperP Li. In one embodiment, the carbon black may take the form of a particle, preferably of a substantially spherical shape and has a particle size in the range of 15-500 nm, preferably 15-300 nm, more preferably 15-150 nm and has a BET surface area in the range of 1000-1600 $m^2/g$, preferably 1200-1500 $m^2/g$, more preferably 1350-1500 $m^2/g$.

In a preferred embodiment, the high density sulfur slurry has a total content of the carbon nanofiber and carbon black that is less than 10 wt % relative to the total dry weight of the slurry, preferably less than 9 wt %, more preferably 5-9 wt %, more preferably 7-9 wt %, more preferably 7.5-8.5 wt % relative to the total dry weight of the slurry.

As used herein, carboxymethyl cellulose (CMC) and styrene butadiene rubber are used as suitable binders in the high density sulfur slurry. Suitable binders are known to one of ordinary skill in the art and are chemically stable in the potential window of use of the electrochemical cell described herein. The high density sulfur slurry is equally envisaged to be adapted to comprise one or more additional suitable binders. Exemplary suitable binders include, but are not limited to, thermoplastics, thermosetting resins, polyethylene, polypropylene, polyethylene oxide (PEO), polytetrafluoroethylene (PTFE), polyvinylidene fluoride (PVDF), styrene butadiene rubber (SBR), carboxymethyl cellulose, cyclodextrin a tetrafluoroethylene hexafluoro ethylenic copolymer, a tetrafluoroethylene hexfluoropropylene copolymer (FEP), a tetrafluoroethyl perfluoroalkyl vinyl ether copolymer (PFA), ethylene-tetrafluoroethylene copolymer (ETFE resin), polychlorotrifluoroethylen resin (PCTFE), a polypropylene-tetrafluoroethylene copolymer, an ethylene-chlorotrifluoroethylene copolymer (ECTFE), an ethylene-acrylic acid copolymer and mixtures or copolymers thereof.

In a preferred embodiment, the high density sulfur slurry has a total content of the carboxymethyl cellulose and styrene butadiene rubber (or total binder content) that is less than 5 wt % relative to the total dry weight of the slurry, preferably 1-4 wt %, more preferably 1.5-3 wt %, more preferably 1.75-2.5 wt % relative to the total dry weight of the binder. In a preferred embodiment, the ratio of carboxymethyl cellulose to styrene butadiene rubber in the high density sulfur slurry is 3:1.

In a preferred embodiment, the encapsulated chalcogen particles comprise (i) a chalcogen core and (ii) a polymer coating disposed on a surface of the chalcogen core, wherein the chalcogen core comprises at least one element selected from the group consisting of sulfur, selenium, and tellurium.

In a preferred embodiment, the sulfur core substantially comprises elemental sulfur. The particles can be generated in situ by precipitation from an aqueous solution of a soluble precursor of elemental sulfur in the presence of specific polymers which encapsulate the sulfur to form the particles. In another embodiment, the sulfur core may further comprise other elements including, but not limited to, tellurium and selenium. In another embodiment, the sulfur core may further comprise conductive carbon black material and/or functionalized conductive carbon black material. The particles may be generated in situ optionally in the presence of these additional materials. The description of such particles is provided in co-pending applications U.S. Ser. No. 14/983,763 and U.S. Ser. No. 14/985,170 both filed Dec. 30, 2015 the disclosures of which are hereby incorporated by reference in their entirety.

In a preferred embodiment, the polymer coating comprises a polymer containing both hydrophobic and hydrophilic domains such that the structure of the polymer governs the growth of enclosed structures including, but not limited to, spheres, cubes, rhomboids, hexagons, and the like which encapsulate elemental sulfur. Exemplary polymers containing both hydrophobic and hydrophilic domains include, but are not limited to a polymer salt of poly(3,4-ethylenedioxythiophene) (PEDOT) and polystyrene sulfonate (PSS), polyvinyl acetate, polyvinyl alcohol, polyvinyl chloride, poly (3,4-ethylenedioxythiophen) polystyrene sulfonate (PEDOT:PSS), polyvinylpyrrolidone ((PVP), polyaniline (PANI), polyethylene oxide (PEO), carboxymethyl cellulose (CMC), sodium carboxymethylcellulose (NaCMC), polymethacrylic acid. (PMA), [poly(2-acrylamido-2-methyl-1-propanesulfonic acid)] (PAMPA), polyvinylidene fluoride copolymer, branched polyethylenimine (bPEI), poly(diallyldimethylammonium chloride)(PDAD), acrylonitrile, polystyrene, polymethyl methacrylate and mixtures thereof.

In a preferred embodiment, the polymer coating comprises at least one polymer selected from the group consisting of poly (3,4-ethylenedioxythiophene) polystyrene sulfonate, polyvinylpyrrolidone, polyaniline, poly(ethylene oxide), carboxymethyl cellulose, sodium carboxymethyl cellulose, polymethacrylic acid, [poly(2-acrylamido-2-methyl-1-propanesulfonic acid)], branched polyethylenimine, and poly(diallyl dimethylammonium chloride).

The use of carbon hosts conventionally employed can be eliminated with the inclusion of a conducting carbon material within the core of the encapsulated chalcogen particles thus increasing the conductivity and leading to significantly improved performance as a cathode active material. In addition, employing chalcogens with higher electrical conductivity than sulfur may reduce or eliminate the amount of conducting carbon material that is needed. The electrical conductivities for tellurium, selenium and sulfur are 5 S/cm, $1 \times 10^{-6}$ S/cm and $5 \times 10^{-18}$ S/cm respectively. Additionally, tellurium and selenium are denser than sulfur and have a volume charge capacity of the same magnitude as sulfur. Therefore, adding selenium and tellurium increases the electrical conductivity of cathodic materials while maintaining, if not improving their charge capacities. In one embodiment, the selenium content, the tellurium content, or both of the encapsulated chalcogen particles is less than 50 wt % relative to the total weight of the encapsulated chalcogen particles, preferably less than 40 wt %, preferably less than 30 wt %, preferably less than 20 wt %, preferably less than 10 wt %, preferably less than 5 wt % relative to the total weight of the encapsulated chalcogen particles.

In a preferred embodiment, conductive carbon black particles and/or functionalized carbon black particles are dispersed, preferably homogeneously dispersed in the chalcogen core or sulfur core. The functionalized conductive carbon material may be any conductive carbon material which can be functionalized for compatibility with the particle structure and morphology according to the present disclosure Exemplary carbon blacks are the same as previously described. The functionalized conductive carbon black material may contain any functional group that promotes dispersion within the formed sulfur core. Preferably, the functionalized conductive carbon black material may comprise carboxyl groups (—COOH) on at least a surface of the functionalized conductive carbon black material.

A degree of functionalization in water may be indicated by a Zeta potential. In a preferred embodiment, a Zeta potential of the functionalized conductive carbon black material may range from −20 mV to −60 mV, preferably −30 mV to −50 mV, more preferably 40 to −50 mV. The surface acidity of the functionalized conductive carbon black material may range from 100-600 milliequivalents (meq) per 100 g of functionalized conductive carbon black material, preferably 200-500 meq/100 g, more preferably 300-450 meq/100 g.

In a preferred embodiment, the sulfur content of the encapsulated chalcogen particles is greater than 90 wt % relative to the total dry weight of the encapsulated chalcogen particles, preferably greater than 91 wt %, preferably greater than 92 wt %, preferably greater than 93 wt %, preferably greater than 94 wt %, preferably greater than 95 wt % relative to the total dry weight of the encapsulated chalcogen particles. In one embodiment, the amount of conductive carbon black and/or functionalized carbon black material homogeneously dispersed in the chalcogen core is in the range of 1.0-10% by weight relative to the total weight of the chalcogen core, preferably 1.0-5.0% by weight, more preferably 1.0-2.0% by weight relative to the total weight of the chalcogen core.

In a preferred embodiment, water is present in the high density sulfur slurry in an amount of 0.25-1.25 times the total dry weight of the slurry, preferably 0.4-1.2, more preferably 0.5-1.0 times the total dry weight of the slurry.

The high density sulfur slurry described herein in any of its embodiments may be prepared by mixing the material according to the above description. The components may be wet blended in the presence of a suitable solvent or dry blended using a mortar or other conventionally known mixing equipment. In one embodiment, the high density sulfur slurry may be further mixed with one or more additional materials conventionally employed to prepare high density sulfur slurries. The method of preparing a high density sulfur slurry are conventionally known to those of ordinary skill in the art and any such method that is compatible with the high density slurry of the present disclosure may be employed.

In further embodiments, the present disclosure provides a method for forming the high density sulfur slurry described herein in any of its embodiments, comprising (i) forming a powder mixture comprising 90 wt % of the encapsulated sulfur particles relative to the total dry weight of the slurry and 8 wt % of carbon nanofibers and carbon black together relative to the total dry weight of the slurry, (ii) grinding the powder mixture to form a fine powder of carbon and active material, (iii) adding a weight corresponding to 2 wt % of carboxymethyl cellulose and styrene butadiene rubber together relative to the total dry weight of the slurry to the fine powder of carbon and active material to form a thick slurry, (iv) adding water to the hick slurry, and (v) mixing the thick slurry to form the sulfur slurry.

In one embodiment, the method may further comprise synthesizing encapsulated sulfur particles by mixing sodium thiosulfate, polymer and an acid in a water solution. For example, sulfur particles may be formed from the reaction of sodium thiosulfate with an acid, such as hydrochloric acid, as indication in the chemical equation (a):

$$Na_2S_2O_3 + 2HCl \rightarrow 2NaCl + SO_2\uparrow + S\downarrow + H_2O \qquad (a):$$

The acid may be selected from the group consisting of hydrochloric acid, oxalic acid, ascorbic acid, concentrated sulfuric acid, nitric acid, methanesulfonic acid and mixtures thereof. For example, a 3:1 mixture (based on the total volume of the acid mixture) of concentrated sulfuric acid and nitric acid may be used. The encapsulated particles obtained, as shown in FIG. 1, provide an encapsulated sulfur material with very high sulfur content (>90%, preferably greater than 95% can be routinely obtained) and thus address the need for higher sulfur content to obtain increased energy density in cathodic materials.

The formation of encapsulated sulfur particle by acid treatment may additionally be performed in the presence of carbon, functionalized carbon or a soluble precursor of at least one of selenium and tellurium ($Na_2SSe_mTe_nO_3$, wherein m and n range from 0 to 1, and the sum of m and n is 1). For example, a soluble precursor for selenium may be $Na_2SSeO_3$. The soluble precursor may additionally be prepared by refluxing sodium sulfite with elemental selenium and/or elemental tellurium in water.

The disclosure is not limited to the particular chemistry described and any method to form and precipitate sulfur elements in the presence of polymers which contain hydrophobic and hydrophilic domains may be employed.

In a preferred embodiment, water is added in amount of 0.4-1.2 ml per gram of the thick slurry, preferably 0.45-1.2 mL/g, more preferably 0.5-1.0 mL/g, more preferably 0.6-0.8 mL per gram of the thick slurry. In another embodiment, the method may further comprise ball milling the fine powder of carbon and active material after the grinding. As used herein, "a ball mill" refers to a type of grinder and "ball milling" refers to the principle of impact and attrition, wherein size reduction is done by impact with balls acting as grinding media. Different materials may be used as grinding media, including ceramic balls, rubber balls and/or stainless steel balls, preferably low-energy balls are used. Advantages include better mixing without abrasive grinding. The ball milling may be performed for up to 2 hours, preferably 0.5-2.0 hours, more preferably 0.5-1.5 hours, or 1.0 hour at a speed of less than 200 rpm, preferably 100-200 rpm, preferably 105-180 rpm, preferably 110-160 rpm, more preferably 115-140 rpm, more preferably 120-130 rpm or 120 rpm.

As used herein, "mixing" refers to any form of agitation process that creates contact between the materials of the slurry, preferably high energy agitation including, but not limited to, grinding, rotating, humbling, centrifugation, planetary centrifugation and/or ultrasonication. In a preferred embodiment, the mixing is performed by planetary centrifugation. As used herein, "planetary centrifugation" refers to mixing employing a mechanism wherein the container holding the material revolves in one direction and the container itself rotates in the other direction. For example, the container holding the material revolves clockwise and the container itself rotates counter-clockwise. The centrifugal force produced by the high-speed rotation and revolution depresses the material in the container, and can generate vertical spiral convection. This vertical spiral convection is continuously generated to blend and disperse the material evenly. Advantages include even mixing of high-viscosity material in a small amount of time, dispersing without shearing, high reproducibility of the dispersion, and reduced material loss. Exemplary commercial planetary centrifugation apparatuses include, but are not limited to, Thinky® cups and the like. In a preferred embodiment, the planetary centrifugation is performed for up to 15 minutes, preferably 1-10 minutes, more preferably 2-5 minutes at a speed of greater than 1000 rpm, preferably 1000-5000 rpm, preferably 1500-3500 rpm, more preferably 1750-2500 rpm, or 2000 rpm.

The cathode may be formed or prepared by mixing the high density sulfur slurry as described herein and application of the high density slurry to the charge collector. In one embodiment, the high density sulfur slurry may be further mixed with one or more additional materials conventionally employed to prepare a cathode structure. The method of construction of a cathode employing an active material comprising a high density sulfur slurry are conventionally known to those of ordinary skill in the art and any such method that is compatible with the high density slurry of the present disclosure may be employed. Generally, the slurry as active material is mixed, coated onto a metal foil as charge collector, and dried.

In further embodiments, the present disclosure provides an electrode, preferably a cathode comprising the dried high density sulfur slurry described herein in any of its embodiments. The electrode comprises the dried sulfur slurry as active material and a current collector, wherein the dried sulfur slurry is disposed on a surface of the current collector. Any suitable charge collector may be employed. Exemplary charge collectors include, but are not limited to, carbon, steel, stainless steel, nickel, aluminum, copper and alloys or mixtures thereof. In a preferred embodiment, the current collector substantially comprises aluminum, in a preferred embodiment, the electrode has sulfur content in terms of sulfur weight per current collector area in the range of 3-8 mg/cm$^2$, preferably 4-7 mg/cm$^2$, more preferably 5-7 mg/cm$^2$, more preferably 6-6.5 mg/cm$^2$.

In further embodiments, the present disclosure provides a method of forming the electrode described herein in any of its embodiments, comprising (i) pouring the high density sulfur slurry described herein in any of its embodiments onto the current collector, (ii) forming a wet gap of less than 200 μm to obtain a green electrode (i.e. doctor blading), (iii) drying the green electrode and (iv) calendering the dried green electrode to form the electrode.

As used herein, "doctor blading" refers to any form of blade coating and/or knife coating, a processing method for the fabrication of large area films on rigid or flexible substrates. The well-defined thickness is mainly controlled by the wet gap size of the blade to the surface. In a preferred embodiment, the high density sulfur slurry is doctor bladed on the current collector with a wet gap of less than 200 μm, preferably 100-200 μm, preferably 120-180 μm, more preferably 140-160 μm, or 150 μm.

In a preferred embodiment, the drying is performed in an oven at a temperature of up to 100° C., preferably 50-100° C., preferably 50-95° C., preferably 60-90° C., preferably 70-85° C., more preferably 80-85° C. for up to 12 hours, preferably 6-12 hours, preferably 8-12 hours, more preferably 9-11 hours, or 10 hours. In another embodiment, the drying may be performed in an oven at reduced pressure, and low vacuum may optionally be employed.

As used herein, "calendering" refers to a finishing process employing a calender to smooth, coat and/or thin a material (i.e. pressing). The "calender" may comprise a series of hard pressure rollers used to form or smooth the high density sulfur slurry on the current collector after drying, as well as providing a consistent-thickness. In a preferred embodiment, the dried electrode is calendered such that the electrode has less than 50% of the thickness of the dried electrode, preferably less than 10-50%, preferably 25-50%, preferably 30-50%, preferably 40-50% of the thickness of the dried electrode.

The cathode thus prepared may be employed in the construction of an electrochemical cell or battery in any conventionally known manner comprising the electrode as described in any of its embodiments, an anode and an electrolyte in a solvent. Thus, according to another aspect, the present disclosure provides a battery comprising an anode and a cathode formed from the high density sulfur slurry described herein in any of its embodiments.

In a preferred embodiment the anode comprises an alkali metal, an alkaline earth metal or both. Exemplary alkali metals include, but are not limited to, lithium (Li), sodium (Na), and potassium (K). Exemplary alkaline earth metals include, but are not limited to, beryllium (Be), magnesium (Mg) and calcium (Ca). In a preferred embodiment, the anode substantially comprises an alkali metal as active material, more preferably lithium or sodium as active material, most preferably lithium as active material. In one embodiment, the anode may substantially comprise lithium as active material and be pretreated with one or more lithium polysulfides before forming the electrochemical cell described herein. As used herein, "lithium polysulfides" refers to compounds having the general formula $Li_2S_N$, wherein N is a whole number greater than zero. Exemplary lithium polysulfides include, but are not limited to, $Li_7S$, $Li_2S_2$, $Li_2S_4$, $Li_2S_6$, $Li_2S_8$ and mixtures thereof.

In a preferred embodiment, the anode is lithium and the electrolyte is a lithium electrolyte ion or mobile ion carrier and may be any conventionally known to one of ordinary skill in the art. Exemplary lithium electrolytes may include, but are not limited to, one or more of lithium nitrate ($LiNO_3$), lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_2SO_3$), bis-(trifluoromethane)sulthnimide lithium salt ($LiN(CF_3SO_2)_2$, LiTFSI), bis-(perfluoroethane) sulfonimide lithium salt ($LiN(C_2F_5SO_2)_2$, LiBETI) and mixtures thereof. In a preferred embodiment, the electrolyte comprises LiTFSI and $LiNO_3$, more preferably a mixture of LiTFSI and $LiNO_3$, most preferably a mixture of LiTFSI and $LiNO_3$ in a molar ratio of 5:1.

In a preferred embodiment, the solvent is a non-aqueous solvent, more preferably at least one of cyclic carbonates, chain carbonates, cyclic esters, cyclic ethers and chain ethers (including glycol ethers) and mixtures thereof. Exemplary cyclic carbonates include, but are not limited to ethylene carbonate, propylene carbonate, butylene carbonate and vinylene carbonate. Exemplary chain carbonates include, but are not limited to, dimethyl carbonate, diethyl carbonate, and methyl ethyl carbonate. Exemplary cyclic esters include, but are not limited to, gamma butyrolactone and gamma valerolactone. Exemplary cyclic ethers include, but are not limited to, tetrahydrothran, 2-methyltetrahydrofuran, and dioxolane. Exemplary chain ethers and glycol ethers include, but are not limited to dimethoxyethane and ethylene glycol diethyl ether. In a preferred embodiment, the solvent comprises glyme and dioxolane, more preferably a mixture of glyme and dioxolane, most preferably a mixture of glyme and dioxolane in a weight ratio of 1:1. As used herein, "glyme" refers to any of the glycol ethers including glycol ethers, dialkyl ethers and esters, more preferably dimethoxyethane.

In further embodiments, the present disclosure includes a vehicle containing the battery according to the present disclosure. As used herein, the term "vehicle" refers to any power driven device designed for transportation including, but not limited to, an automobile, truck, van, bus, golf cart, and other utility forms of transportation.

Having generally described this disclosure, a further understanding can be obtained by reference to certain specific examples which are provided herein for purposes of illustration only and are not intended to be limiting unless otherwise specified.

EXAMPLES

Preparation of High Density Sulfur Cathode Slurries

High density sulfur cathode slurries (0.5-1.0 g scale) can be prepared by the following techniques. An encapsulated sulfur particle was synthesized by mixing sodium thiosulfate, functionalized carbon, polymer and an acid in a water solution. A typical reaction yields an active material with a sulfur content of 95% by thermogravimetric analysis (TGA). FIG. 1 shows a TGA plot of sulfur active material with 95% sulfur and 5% polymer coating and carbon content together carried out under flowing nitrogen. A weight corresponding to 90% active material (i.e. encapsulated sulfur particle) was mixed with a weight corresponding to 8% carbon and grinded well for 5 minutes in a mortar and pestle. The carbon added consisted of a 3:1 mixture of carbon nanofibers (3 parts) such as those sold from Sigma Aldrich and activated carbon black (such as Ketjen Black or SuperP Li) (1 part). This fine powder was optionally ball milled for 1 hour at a low speed of 120 rpm with low energy balls for the purposed of better mixing without grinding. A weight corresponding to 2% of binder was added to the active material/carbon mixture in the mortar. The binder consisted of a 3:1 mixture of carboxymethyl cellulose (CMC) and styrene butatdiene rubber (SBR), where CMC is a 3% solution of CMC in water and SBR is a 4% solution of SBR in water. This mixture is grinded well with the pestle for several minutes until a thick slurry forms having ice cream/mud consistency. This thick slurry is collected from the mortar and placed in a small planetary centrifugal mixer (i.e. a Thinky® cup). Water is added as needed (~0.25 mL to 0.50 mL of water for ~0.5 g scale) to the slurry in the planetary centrifugal mixer and mixed by the planetary centrifugal mixer for 2-5 minutes at 2000 rpm.

Preparation of Electrode and Battery from High Density Sulfur Slurries

Figure 2:
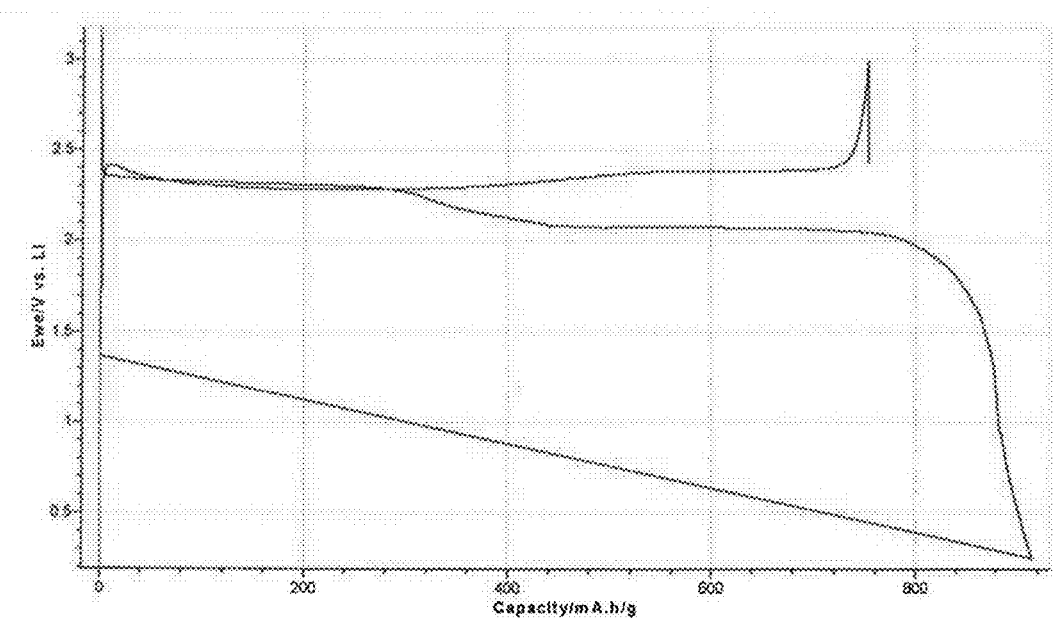
FIG. 2 shows a charge/discharge plot of a 2032 coin cell with a cathode containing 86% sulfur originating from the coated sulfur particles and high loading sulfur slurry described herein with a sulfur areal loading of 6.23 mg S/cm$^2$ and the carbon additives, binders, electrolyte and all other preparation variables are as shown in the Example.

Following planetary centrifugation, the slurry can be easily poured onto the aluminum current collector and doctor bladed with a wet gap of around 150 μm. The cathode is dried in an oven at 80° C. for 10 hours, the use of low vacuum is optional. The dried cathode is calendered or pressed to less than 50% of its dry thickness. The target sulfur weight per current collector area should be ~5 $mg/cm^2$ with a ratio of ~85-90%. The battery can be assembled with an electrolyte such as 1M LiTHSI, 0.2M $LiNO_3$ in a solvent comprised of a 1:1 mixture of glyme to dioxolane. Lithium metal can be used as the battery anode. The lithium metal anode can be pretreated by exposure to a 0.1M solution of lithium polysulfides in THF. 200 μL of electrolyte and thick (~1 mm) cotton separator were used in a 2032 coin cell. FIG. 2 shows a charge/discharge plot of a 2032 coin cell with a cathode containing 86% sulfur originating from the coated sulfur particles and the high loading sulfur slurry described herein with a sulfur loading of 6.23 mg $S/cm^2$, the rate of operation is 0.1 C calculated based on the theoretical capacity of sulfur (1672 mAh/g). The carbon additives, binders, electrolyte and all other preparation variables are as described in the example.

Figure 3:
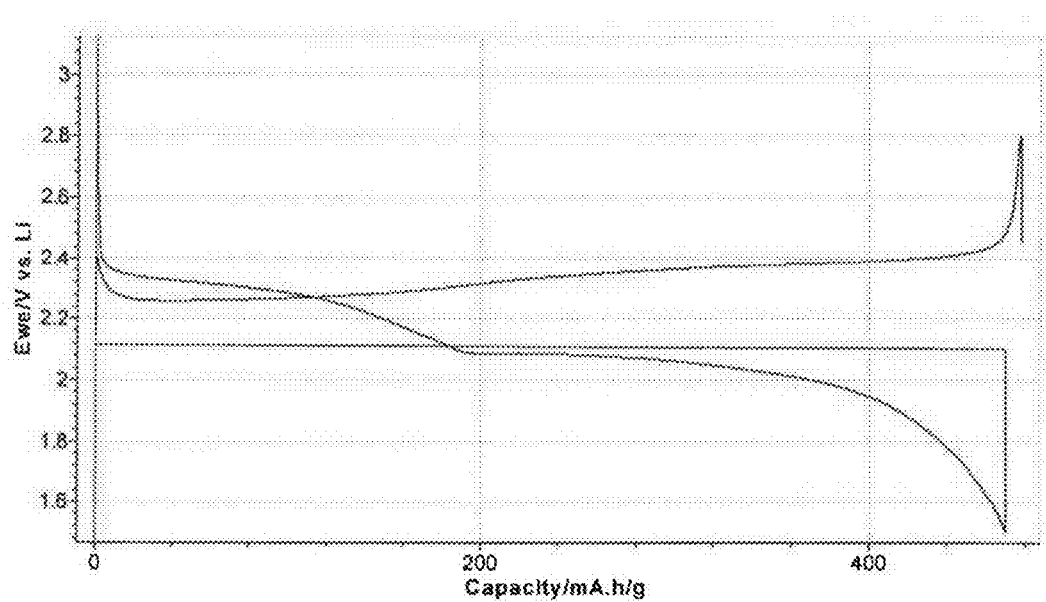
FIG. 3 shows a charge/discharge plot of a 2032 coin cell with a cathode containing 86% sulfur originating from the coated sulfur particles and high loading sulfur slurry described herein with a sulfur areal loading of 6.23 mg S/cm$^2$ with acetylene black used as a conductive additive.
Figure 4:
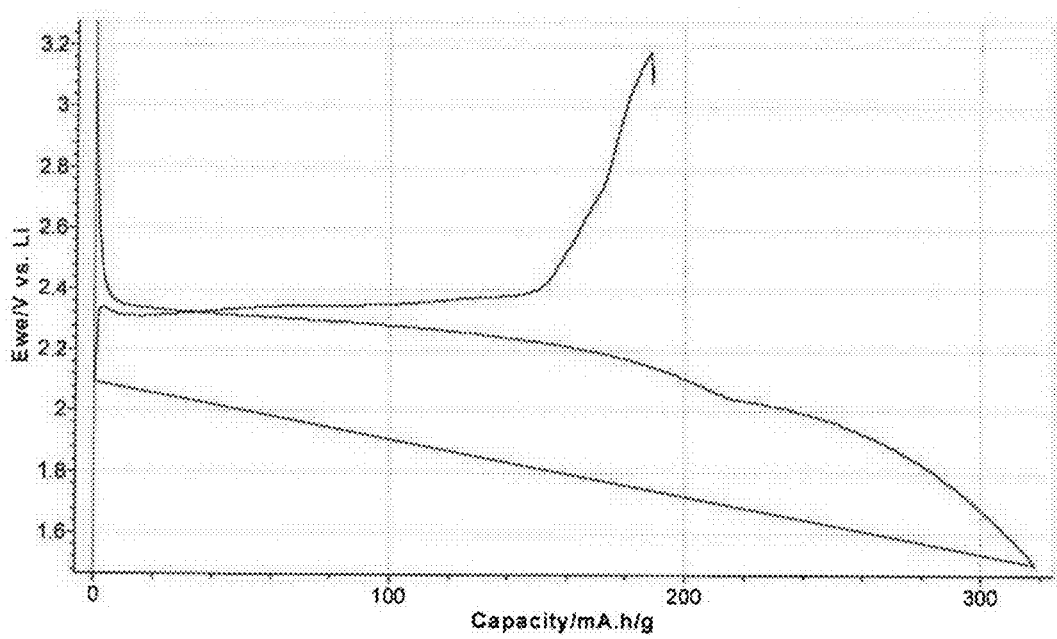
FIG. 4 shows a charge/discharge plot of a 2032 coin cell with a cathode containing 86% sulfur originating from the coated sulfur particles and high loading sulfur slurry described herein with a sulfur areal loading of 6.23 mg S/cm$^2$ with a 2:1 mixture of polyethylene oxide (PEO) and styrene rubber butadiene (SRB) used as a binder.

The use of carbon nanofibers is crucial to the successful cycling of cathodes with a high areal loading of sulfur. The 3:1 ratio offered the best results for our active materials. It was also shown to be important to press the dry cathodes to more than 50% of their original dry thickness. Cathodes which only use the typical SuperP Li, Ketjen black or acetylene black suffer from low capacity. FIG. 3 shows a charge/discharge plot of a 2032 coin cell with a cathode containing 86% sulfur originating from the coated sulfur particles and the high loading sulfur slurry described herein with a sulfur areal loading of 6.23 mg $S/cm^2$, the rate of operation is 0.1 C calculated based on the theoretical capacity of sulfur (1672 mAh/g) and using acetylene black as a conductive additive. The use of water soluble CMC:SBR is essential for cycling cathodes with a high loading of sulfur. Other binders such as polyethylene oxide (PEO) or polyvinylidene fluoride (PVDF) in N-methyl-2-pyrrolidone (NMP) resulted in low capacities and poor cycling. FIG. 4 shows a charge/discharge plot of a 2032 coin cell with a cathode containing 86% sulfur originating from the coated sulfur particles and the high loading sulfur slurry described herein with a sulfur areal loading of 6.23 mg S/cm2, the rate of operation is 0.1 C calculated based on the theoretical capacity of sulfur (1672 mAh/g) and using a 2:1 mixture of polyethylene oxide (PEO) and styrene rubber butadiene (SRB) as binder.

The invention claimed is:
1. A slurry, comprising:
  encapsulated chalcogen particles, comprising a chalcogen core and an encapsulate coating disposed on the chalcogen core surface consisting of at least one polymer having both hydrophobic regions and hydrophilic regions;
  carbon nanofibers;

carbon black;
carboxymethyl cellulose;
styrene butadiene rubber; and
water;
wherein
  a sulfur content of the encapsulated chalcogen particles is greater than 90 wt % relative to the total dry weight of the encapsulated chalcogen particles,
  a content of sulfur is greater than 85 wt % relative to a total dry weight of the slurry; and
  a ratio of carbon nanofibers to carbon black is 3:1.

2. The slurry of claim 1, wherein a total content of the carbon nanofiber and carbon black is less than 10 wt % relative to the total dry weight of the slurry.

3. The slurry of claim 1, wherein a total content of the carboxymethyl cellulose and styrene butadiene rubber is less than 5 wt % relative to the total dry weight of the slurry.

4. The slurry of claim 1, wherein a ratio of carboxymethyl cellulose to styrene butadiene rubber is 3:1.

5. The slurry of claim 1, wherein water is present in an amount equal to 0.25-1.25 times the total dry weight of the slurry.

6. The slurry of claim 1, wherein the chalcogen core further comprises at least one of selenium and tellurium.

7. The slurry of claim 1, wherein the polymer coating consists of at least one polymer selected from the group consisting of poly (3,4-ethylenedioxythiophene) polystyrene sulfonate, polyvinylpyrrolidone, polyaniline, poly(ethylene oxide), carboxymethyl cellulose, sodium carboxymethyl cellulose, polymethacrylic acid, poly(2-acrylamido-2-methyl-1-propanesulfonic acid), branched polyethylenimine, and poly(diallyl dimethylammonium chloride).

8. The slurry of claim 6, wherein a selenium content or a tellurium content of the encapsulated chalcogen particles is less than 50 wt % relative to a total weight of the encapsulated chalcogen particles.

9. The slurry of claim 6, wherein the encapsulated chalcogen core further comprises carbon black particles, functionalized carbon black particles or both which are homogeneously dispersed in the chalcogen core.

10. A method for forming the slurry of claim 1, comprising:
  forming a powder mixture comprising 90 wt % of the encapsulated chalcogen particles relative to the total dry weight of the slurry and 8 wt % of carbon nanofibers and carbon black together relative to the total dry weight of the slurry;
  grinding the powder mixture to form a powder of carbon and active material;
  adding a weight corresponding to 2 wt % of carboxymethyl cellulose and styrene butadiene rubber together relative to the total dry weight of the slurry to the powder of carbon and active material to form a thick slurry;
  adding water to the thick slurry;
  mixing the thick slurry to form the slurry.

11. The method of claim 10, wherein water is added in an amount of 0.4-1.2 mL per g of the thick slurry.

12. The method of claim 10, wherein the mixing is performed by planetary centrifugation for up to 15 minutes at a speed of greater than 1000 rpm.

13. The method of claim 10, further comprising ball milling the fine powder of carbon and active material for up to 2 hours at a speed of less than 200 rpm.

14. An electrode, comprising:
  the dried slurry of claim 1 as active material; and
  a current collector;
  wherein the dried slurry is on a surface of the current collector.

15. The electrode of claim 14, wherein a sulfur weight per current collector area is in the range of 3-8 mg/cm$^2$.

16. The electrode of claim 14, wherein the current collector comprises aluminum.

17. A method for forming the electrode of claim 14, comprising:
  pouring the slurry onto the current collector
  forming a wet gap of less than 200 μm to obtain a green electrode;
  drying the green electrode; and
  calendering the dried green electrode to form the electrode.

18. The method of claim 17, wherein the drying is performed in an oven at a temperature of up to 100° C. for up to 12 hours.

19. The method of claim 17, wherein the dried green electrode is calendered such that the electrode has less than 50% of the thickness of the dried green electrode.

20. A battery, comprising:
  the electrode of claim 14 as a cathode;
  an anode; and
  an electrolyte in a solvent.

21. The battery of claim 20, wherein the anode comprises a metal selected from the group consisting of an alkali metal and an alkaline earth metal.

22. The battery of claim 20, wherein the anode is lithium and the electrolyte comprises LiTFSI and LiNO$_3$ in a molar ratio of 5:1.

23. The battery of claim 22, wherein the solvent comprises glyme and dioxolane in a weight ratio of 1:1.

24. The battery of claim 20, wherein the anode is lithium and the anode is pretreated with a lithium polysulfide.

25. A vehicle comprising the battery of claim 20.

* * * * *